United States Patent [19]
Hon et al.

[11] Patent Number: 5,852,801
[45] Date of Patent: *Dec. 22, 1998

[54] METHOD AND APPARATUS FOR AUTOMATICALLY INVOKING A NEW WORD MODULE FOR UNRECOGNIZED USER INPUT

[75] Inventors: Hsiao-Wuen Hon; Yen-Lu Chow, both of Saratoga, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 538,919

[22] Filed: Oct. 4, 1995

[51] Int. Cl.$^6$ ........................................................ G01L 5/06
[52] U.S. Cl. ........................... 704/244; 704/243; 704/270
[58] Field of Search ................................. 395/2.52, 2.53, 395/2.79; 704/243, 244, 270

[56] References Cited

U.S. PATENT DOCUMENTS

| | | |
|---|---|---|
| 4,618,984 | 10/1986 | Das et al. ................................. 704/244 |
| 4,914,704 | 4/1990 | Cole et al. ................................ 704/235 |
| 5,027,406 | 6/1991 | Roberts et al. . |
| 5,127,055 | 6/1992 | Larkey ..................................... 704/244 |
| 5,202,952 | 4/1993 | Gillick et al. . |
| 5,220,639 | 6/1993 | Lee . |
| 5,315,689 | 5/1994 | Kanazawa et al. . |
| 5,329,608 | 7/1994 | Bocchieri et al. . |
| 5,377,302 | 12/1994 | Tsiang ..................................... 704/235 |
| 5,465,318 | 11/1995 | Sejnoha ................................... 704/243 |
| 5,765,132 | 6/1998 | Roberts ................................... 704/254 |

*Primary Examiner*—David D. Knepper
*Assistant Examiner*—Tālivaldis Ivars Šmits
*Attorney, Agent, or Firm*—Blakely, Sokoloff, Taylor & Zafman

[57] ABSTRACT

A method for reducing recognition errors in a speech recognition system that has a user interface, which instructs the user to invoke a new word acquisition module upon a predetermined condition, and that improves the recognition accuracy for poorly recognized words. The user interface of the present invention suggests to a user which unrecognized words may be new words that should be added to the recognition program lexicon. The user interface advises the user to enter words into a new word lexicon that fails to present themselves in an alternative word list for two consecutive tries. A method to improve the recognition accuracy for poorly recognized words via language model adaptation is also provided by the present invention. The present invention increases the unigram probability of an unrecognized word in proportion to the score difference between the unrecognized word and the top one word to guarantee recognition of the same word in a subsequent try. In the event that the score of unrecognized word is unknown (i.e., not in the alternative word list), the present invention increases the unigram probability of the unrecognized word in proportion to the difference between the top one word score and the smallest score in the alternative list.

15 Claims, 6 Drawing Sheets

METHOD AND APPARATUS FOR AUTOMATICALLY INVOKING A NEW WORD MODULE FOR UNRECOGNIZED USER INPUT

BACKGROUND OF THE INVENTION

1. Field of the Invention

This invention relates to a method and apparatus for user input recognition programs, and, in particular, to a method and apparatus for reducing recognition errors in user input recognition programs.

2. Description of the Related Art

Speech dictation is arguably the most efficient way to enter large amounts of text into a computer system. This is especially true for the Chinese language. For example, a dictation system that recognizes the Chinese language significantly reduces the overhead, associated with inputting the Chinese language into a computer system. Because the Chinese language is not a alphabet-based system, inputting a Chinese character is difficult and time-consuming. For example, a Chinese character consists of many different strokes, which are not easily represented by a key on a keyboard, as in the English language. Accordingly, it is very unnatural for a user to input the Chinese language into a computer system via keyboard or mouse. Moreover, extensive training in input methods (e.g., Pin-Yin, and Wu-Bi) is typically required to input a non-alphabetic set of characters into a computer system.

Although the input speed of a dictation program may be very fast (e.g., up to 100 words a minute), the speech recognition program will inevitably make recognition errors. However, some of these errors stem from the fact that the spoken words are not in an active lexicon of the recognition program.

In prior art recognition programs, the correction schemes in these dictation programs are tailored for word-based languages (i.e., English and French). As a user is dictating, the computer system displays a list of the words in the vocabulary (e.g., an active lexicon) that best match the spoken word. Then, the user may choose the correct word from the list or may choose to edit a similar word if the correct word is not on the list via mouse, keyboard or voice command. This prior art approach is illustrated in U.S. Patent, entitled "Method for Interactive Speech Recognition and Training" (U.S. Pat. No. 5,027,406; Roberts et al).

However, whereas the words in Western languages are clearly defined by the white space between those words, the concept of a "word" for the Chinese language is very ambiguous because there is no equivalent word separator in the Chinese language. For example, one character or a plurality of characters may constitute a single "word". Consequently, a user cannot easily edit a word in an alternative word list to produce the desired word. Thus, there is a need for a method to reduce recognition error and rapidly adapt to unrecognized words in a speech recognition system.

Moreover, it is an ongoing problem for a user to figure out which dictated words are new words for the dictation program. Once the user figures out that the current word is a word not identified by the computer system, the user enters these words into the active lexicon. The prior art only provides some general rules as to which words are likely to be new words. For example, in most dictation programs, a user guide usually advises a user to enter any personal or company names that a user will likely dictate into the lexicon because most dictation programs do not include personal or company names in the active lexicon.

Furthermore, existing English dictation systems (e.g. DragonDictate and IBM VoiceType) substitute a known and existing word for a new word. If a recognized word is not the top choice, and not in the top-N choice list (i.e., the N-best list), the user can simply input the new word into the system. This approach is straight-forward for alphabetic languages because a user need only type the new word into the system via a regular keyboard. However, this approach is inadequate for non-alphabetic language because of the associated overhead, noted previously. Moreover, the prior art dictation programs do not provide any other suggestion for which dictated words may be new words to the dictation program. Thus, there is also a need for a user interface that instructs the user to enter a word into the lexicon on the occurrence of certain conditions.

SUMMARY OF THE INVENTION

A method to reduce recognition errors is provided. The present invention includes both a user interface and a method to improve the recognition accuracy of poorly recognized words. The user interface instructs a user to invoke a new word acquisition module when a word, spoken by the user, fails to appear in an alternative word list (i.e., N-best list) in two consecutive tries. This user interface significantly improves the probability of spotting new words.

The present invention also improves the recognition accuracy for poorly recognized words via language model adaptation. The present invention uses language model adaptation to increase the chance to recognize the same word in the future. The present invention increases the unigram probability of an unrecognized word in proportion to the difference of the score of the unrecognized word and the score of the top one word in order to increase the probability of recognizing that word in the future.

The user interface and the language model adaptation work hand-in-hand to greatly reduce recognition errors in speech recognition systems and effectively resolve the problems, noted in the Background section.

Hence, the invention provides a method for reducing recognition errors. This method provides a user interface that instructs the user to invoke a new word acquisition module upon a predetermined condition and also provides a method to improve the recognition accuracy for poorly recognized words. Other features and advantages of the invention will become apparent from the detailed description below in connection with the attached drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be noted, however, that all of these and similar terms are to be associated with the appropriate physical quantities and are merely convenient labels applied to these quantities. Unless specifically stated otherwise, it should be noted that throughout the description of the present invention, terms such as "processing" or "computing" or "calculating" or "determining" or "displaying" or the like, refer to the action and processes of a computer system, or similar electronic computing device, that manipulates and transforms data represented as physical (electronic) quantities within the computer system's register and memories into other data similarly represented as physical quantities within the computer system memories or registers or other such information storage, transmission or display devices.

The present invention also relates to an apparatus for performing the processing steps of the present invention. This apparatus may be specially constructed for the required purposes, or it may comprise a general purpose computer selectively activated or reconfigured by a computer program. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will become apparent from the description below. In addition, the present invention is not described with reference to any particular programming language. It will be appreciated that a variety of programming languages may be used to implement the teachings of the invention as described herein.

One embodiment of the preferred embodiment of the present invention is a speech recognition system. However, it should be realized that the present invention is not limited to such systems and applies equally to other pattern recognition systems, such as handwriting recognition systems in which reference and observed vectors would relate to handwriting patterns and data as input from a stylus and tablet, for example.

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams and flow charts. As to the flow charts, each block within the flow charts represents both a method step and an apparatus element for performing the method step. Depending upon the implementation, the corresponding apparatus element may be configured in hardware, software, firmware or combinations thereof.

Initially, an overview of an exemplary computer system incorporating the invention will be described with reference to FIGS. 1A and 1B. Then, an overview of the main functional blocks of a software program, in which the present invention may be implemented, will be described. The two flow charts illustrating aspects of the present invention will then be described with reference to FIGS. 3 and 4.

Figure 1A:
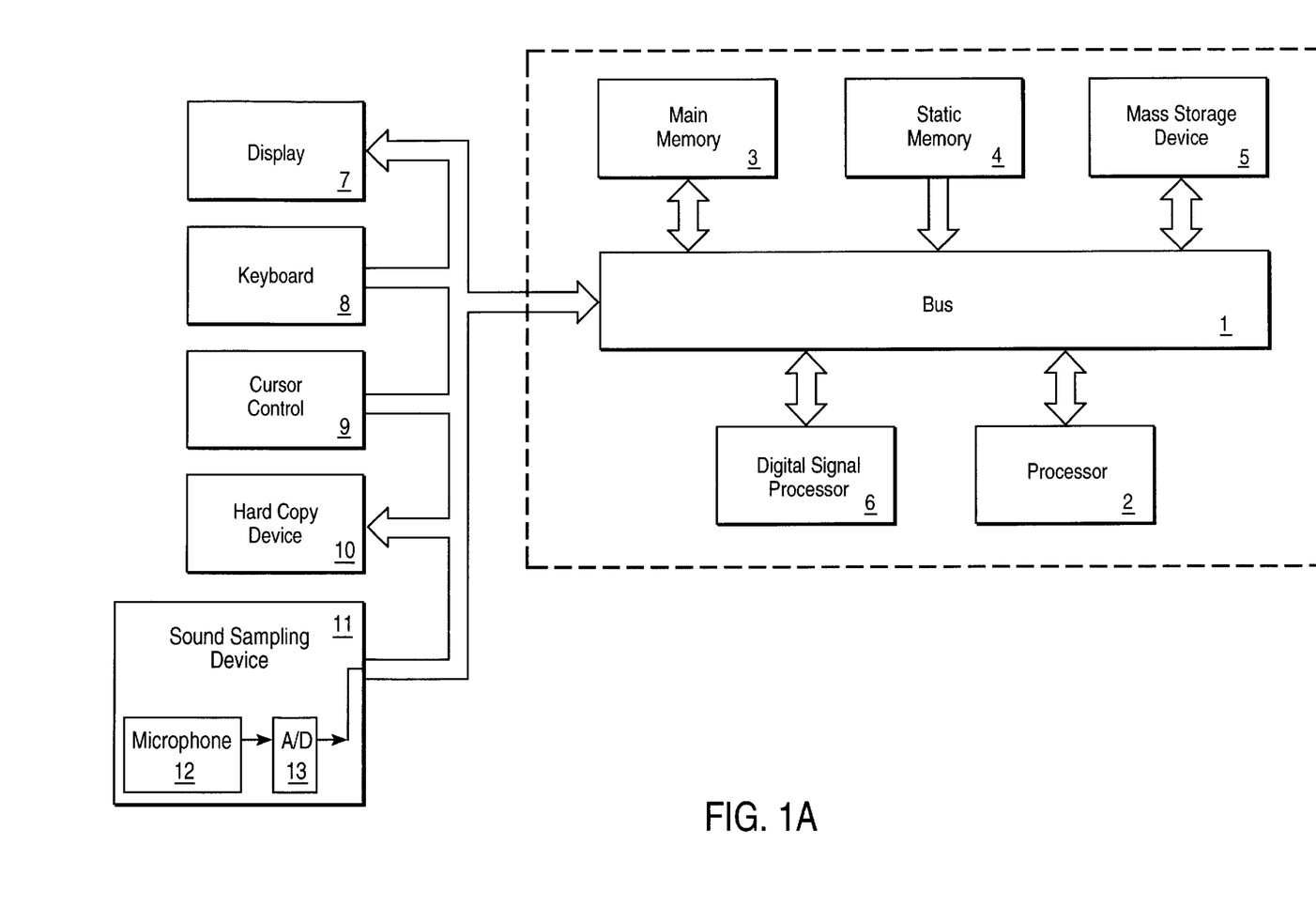
FIG. 1A is a block diagram of a computer system in which the present invention may be implemented.

FIG. 1A illustrates a block diagram of a general computer system in which the preferred embodiment of the present invention may be implemented. This computer system includes a bus 1 for communicating information, a central processor (CPU) 2, coupled with the bus, for processing information and instructions, a random access memory (RAM) 3 coupled with the bus 1, for storing information and instructions for the (CPU) 2, and a read only memory (ROM) 4, coupled with the bus 1, for storing static information and instructions for the (CPU) 2. Furthermore, a data storage device 5, such as a magnetic disk and disk drive, coupled with the bus 1, for storing information (e.g., audio or voice data) and instructions, a display device 7, coupled to the bus 1, for displaying information to the computer user, and alphanumeric input device 8, including alphanumeric and function keys, coupled to the bus 1 for communicating information and command selections to the (CPU) 2, and a cursor control device 9, coupled to the bus 1, for communicating user input information and command selections to the (CPU) 2 are provided. Also, a hard copy device 10 (e.g., a printer) for printing information on a medium (e.g., paper, film, similar types of media), a sound sampling device 11, including a microphone 12, for receiving audio input or voice data to be processed and stored by the computer system, and an analog to digital converter (A/D) 13, coupled to the microphone 12 and the bus 1, for transforming analog voice data from the microphone 12 to digital form, are provided. In the event of a handwriting recognition system, a stylus and tablet (not shown in FIG. 1), may be coupled to the bus 1, for communicating digital information representative of the handwriting to the processor 2.

The computer system may also include a signal processor 6, coupled to the bus 1, for preliminary processing of the voice data before it is communicated to the processor 2 and the rest of the system over the bus 1. A signal generation device (not shown in FIG. 1), which includes a standard speaker for realizing the output audio from input signals from the computer system, is also provided. Block 15 also includes well known audio processing hardware to transform digital audio data into audio signals for output to the speaker, thus creating an audible output.

The display device 7 may be a liquid crystal device, cathode ray tube, or other display device suitable of recreating graphic images and alphanumeric characters recognizable to the user. The cursor control device 9 allows the computer user to dynamically signal the two dimensional movement of a visible symbol (pointer) on a display screen of the display device 7. Many implementations of the cursor controlled device are known in the art including a trackball, mouse, joystick or special keys on the alphanumeric input device 8 capable of signaling movement of a given direction or manner of displacement. It is to be appreciated that the cursor means 9 also may be directed and/or activated via input from the keyboard using special keys and key sequence commands. Alternatively, the cursor may be directed and/or activated via input from a number of specially adapted cursor directing devices, including those uniquely developed for the disabled. The input cursor directing device or push button may consist of any of those described above and specifically is not limited to the mouse cursor device.

Figure 1B:
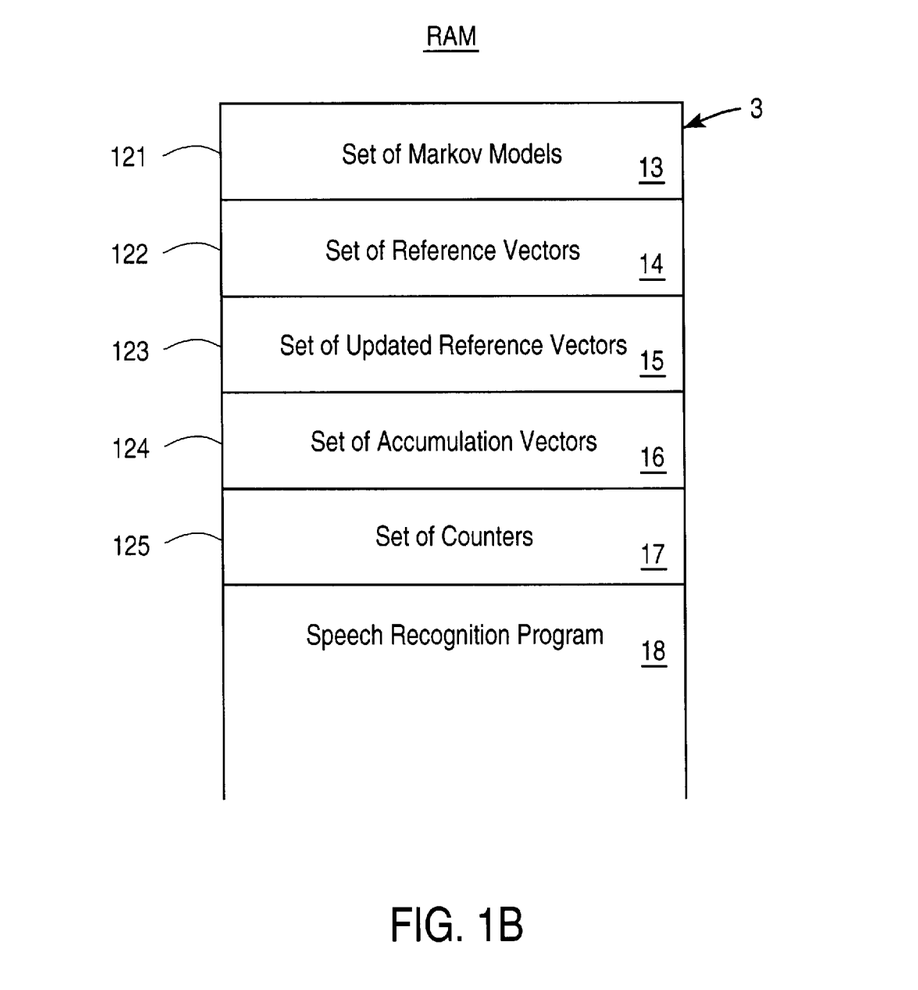
FIG. 1B is a block diagram of the random access memory of FIG. 1A.

FIG. 1B shows an exemplary data structure arrangement of, memory 3 (RAM). Memory 3 shows the storage of a set or array of Hidden Markov Models 13, a set or array of reference vectors 14, a set or array of update reference vectors 15, a set or array of accumulation vectors 16, and a set or array of counters 17 in blocks, and a speech recognition program 18. Note that FIG. 1B is exemplary and the illustrated order of the above data arrays is not intended to limit the scope of the present invention. For example, the set of updated reference vectors could alternatively be stored in a storage device 104, or the set of Markov Models could alternatively be stored in a storage device 104 or a read only memory 4. However, the recognition system is not limited to only Markov Model-based systems.

The storage of sets or arrays in memory 3, as shown in FIG. 1B, is well known in the art. Each set of array is stored in a block of memory as shown. Note that the ordering of these blocks is exemplary and is not intended to limit the scope of the present invention. For example, the set or array of Markov Models 13 may be positioned physically in memory 3 before or after the set or array of reference vectors 14. The computer system will determine which block of memory 3 each set or array should be stored in. Note also that the size of the blocks may not be identical; the computer system will determine the size of the block necessary to store each set or array.

Figure 1C:
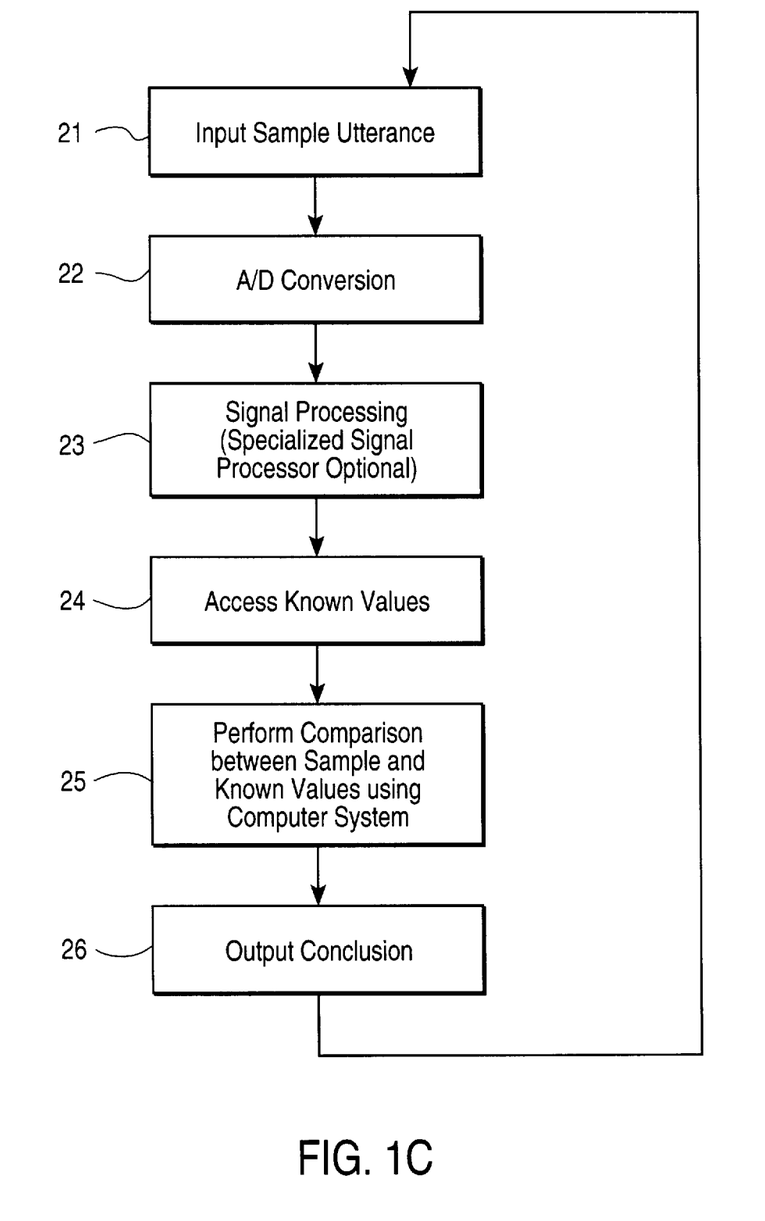
FIG. 1C shows a flowchart of the general method, used by a computer system of the present invention.

FIG. 1C shows a flowchart of the general method of speech processing used by a computer system of the present invention. Input utterance data is introduced to the computer system at step 21. The form of this input may vary. For example, the input may be voice data from a live microphone or a recorded voice. Upon receiving input, the system transforms the analog voice data signals to digital form at step 22, which can be processed by the computer system of the present invention.

In step 23, the utterance (in digital form) is processed. A specialized signal processor is optional; for example, if the computer system contains a signal processor 111, it may be employed to process the utterance, thereby alleviating the central processor 2 of the task. In systems where no signal processor exists, or one exists but is not utilized, the central processor 2 must perform the task. Regardless of which processor performs the task, the utterance (in digital form) is processed by being sliced in equal increments along the time dimension. Typically, the utterance signal is divided into 100 slices per second. However, the duration of a single slice may vary from system to system, and the duration given above is exemplary and not intended to limit the scope of the present invention. Each slice is then converted into a vector, referred to as an observed vector, the creation of which is well known in the art. An observed vector, in one form, represents a summary of the utterance data for a given time slice. For instance, such a vector may consist of signal intensity or numerical energy data over a given set of frequency ranges.

In step 24, the present invention directs the computer system to access known values which are stored in a memory unit 3 or other storage device of the system. These known values may consist of a set of Hidden Markov Models (Models) and reference vectors, such as Gaussian means, both of which are well known in the art. One or more of the reference vectors is associated with each arc of each Hidden Markov Model.

At step 25 the present invention directs the computer system to compare the utterance, represented by the set of observed vectors, to the set of Hidden Markov Models. This comparison is done in part using any of a variety of procedures well known in the art, such as the Viterbi procedure, which determines the best path of an unknown utterance through the given set of Hidden Markov Models. The Viterbi procedure also associates the unknown vectors of the unknown utterance to particular arcs of the Markov Models. This information will be read by the present invention to associate a given observed vector to a set of reference vectors.

The result of the comparison is output at step 26. This output is a sequence of models that are the closest match to the set of observed vectors. It should be noted that no guarantee exists that the resultant sequence of models is the correct interpretation of the utterance. The resultant sequence of models is the one with the highest probability of accuracy; however, the interpretation is correct an overwhelming majority of the time.

The output step 26 encompasses a broad range of possibilities. For example, the system may output the data in visual form over the display device 7, in audio form over the speaker included in signal generation device 108, or storage format in storage device 5 or random access memory 3. Another potential output is the execution of a command, (running an application program, opening or closing a particular data file, performing a maneuver in a running application such as a game, or shutting off the computer).

Figure 2:
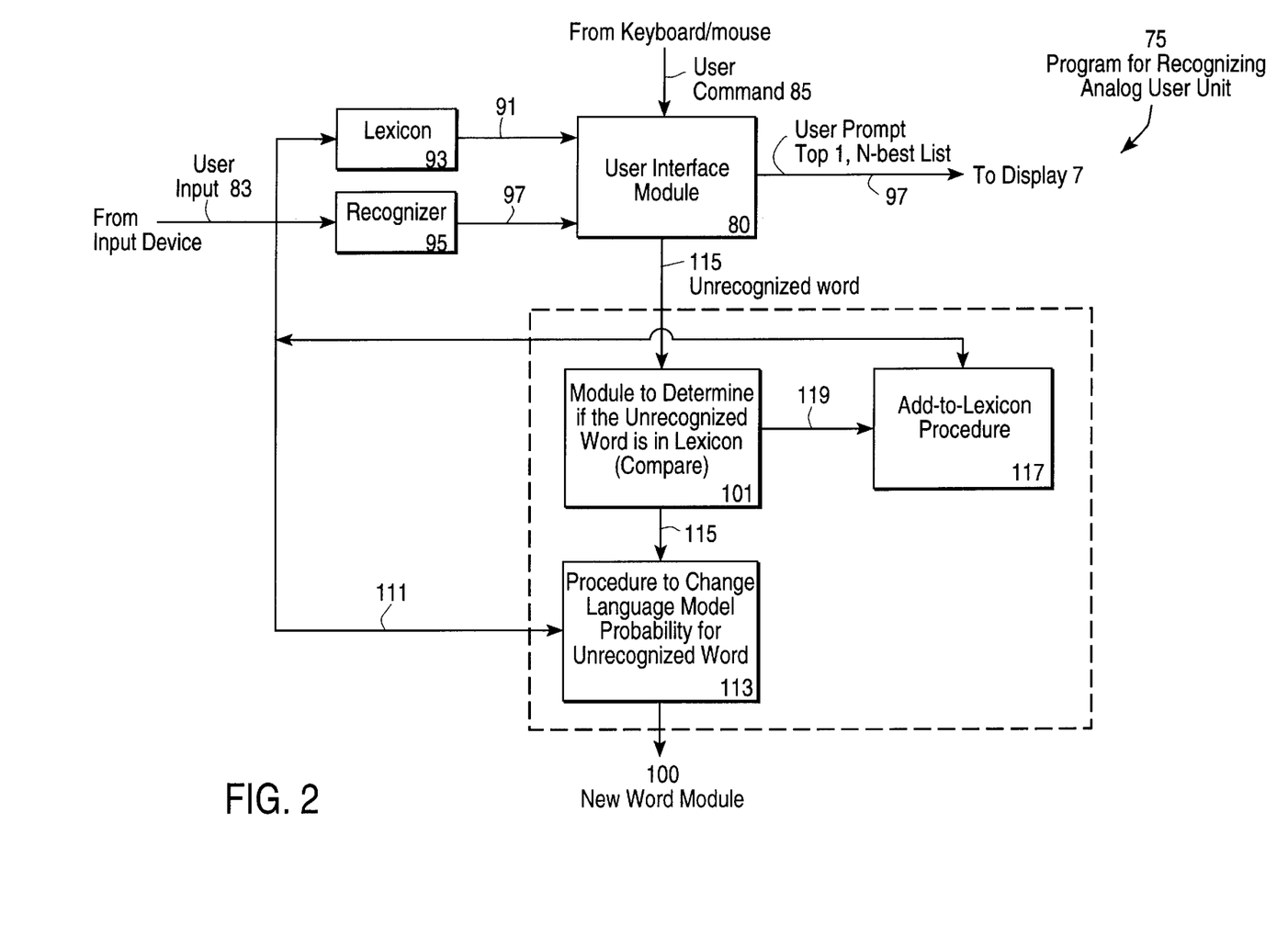
FIG. 2 is a block diagram of a software program in which the present invention may be implemented.

FIG. 2 illustrates a block diagram of a computer program in which the present invention may be implemented. This computer program 75 in one embodiment is a speech recognition software application. This software program 75 is stored in main memory 3 and subsequently directs the processor 2 to process all the instructions contained in the program 75.

This software program 75 includes several functional blocks. The program 75 includes a Recognizer 95, as described in FIG. 1C, which receives user speech input 83 from the sound sampling device 11. The program 75 also includes a User Interface Module 80 that receives user commands 85 from the keyboard 8 and from the cursor control (e.g., mouse 9). The User Interface Module 80 also is provided a lexicon of all words that the computer program 75 recognizes by a Lexicon Module 93. This information is stored in a data structure in the Lexicon Module 93 and is provided to the User Interface Module 80 through data path 91.

An exemplary data structure for containing parameters associated with each word in the lexicon is shown in Table 1.

TABLE 1

| | RAM | Example |
|---|---|---|
| 221- | Word ID | 298 |
| 222- | Orthography of the word (word transcription) | Chinese Character |
| 223- | Pin-Yin (pronunciation) | W03-MEN2 |

TABLE 1-continued

| | RAM | Example |
|---|---|---|
| 224-225- | Unigram probability | 0.012 |
| | . | |
| | . | |
| | . | |

Every word has associated with it a number of parameters that describe traits of that particular word. One such parameter is a unigram probability. Unigram probability is simply the probability that the particular word will be spoken by the user into the dictation system. Although in one embodiment of the present invention, the unigram probability of an unrecognized word will be manipulated, the present invention may be adapted to other probabilistic language models as well. For example, by recording additional information and parameters on the context of where the unrecognized word occurs (e.g., in a sentence), a bi-gram or a tri-gram probabilistic language model may be tracked and updated appropriately. A bi-gram probabilistic language model simply bases the probability that a particular word will be the desired spoken word based on a previous word in the sentence. Similarly, a tri-gram probabilistic language model bases the probability that a particular word will be the next spoken word on the two preceding words in a sentence.

The User Interface Module 80 receives these inputs and provides information 97 to the display device 7. This information 97 includes user prompts, which prompt the user to perform certain functions or select certain options in the program, a top one word and an N-best List, if requested by the user. The specific process steps carried out by the User Interface Module 80 will be described in detail hereinafter with reference to FIG. 3.

Upon receipt of a user command 85 to invoke a New Word Module 100 or after a user makes correction to a top one candidate, the User Interface Module 80 passes control to a module 101 that determines if an unrecognized word is in the lexicon. This module 101 is provided the relevant information about the unrecognized word and passes control of the process flow to either the Add-To-Lexicon Procedure 117 through a first control path 119 or to the Change-Word-Score Procedure 113 through a second control path 115. The specific steps carried out by the module 101 to determine if an unrecognized word is in the lexicon is illustrated in detail hereinafter with reference to FIG. 4.

After control is passed to the Add-To-Lexicon Procedure 117, this procedure 117 manipulates and adds the unrecognized word to the Lexicon Module 93 through data path 111. Similarly, the Change Word-Score Procedure 113 manipulates and changes the score of the unrecognized word by accessing the Lexicon Module 93 through data path 111.

A dictation software program 75 does not find or detect unrecognized words until one of the following occurs: 1) when a user corrects the dictated text, or 2) a user invokes the New Word Acquisition Module 100.

When a user corrects dictated text via a mouse, keyboard or voice command by selecting an alternative word in the alternative word list (or by manually editing the words), the program 75 records information about the unrecognized word. This information may include orthography of the word, unigram probability, and a difference of the score between the unrecognized word and the top one candidate. If the unrecognized word is in the active lexicon of the program 75, then the language module adaptation 113 of the present invention is implemented. If the unrecognized word is not in the active lexicon, then the Add-to-Lexicon module 117 of the present invention adds the word to the lexicon.

Figure 3:
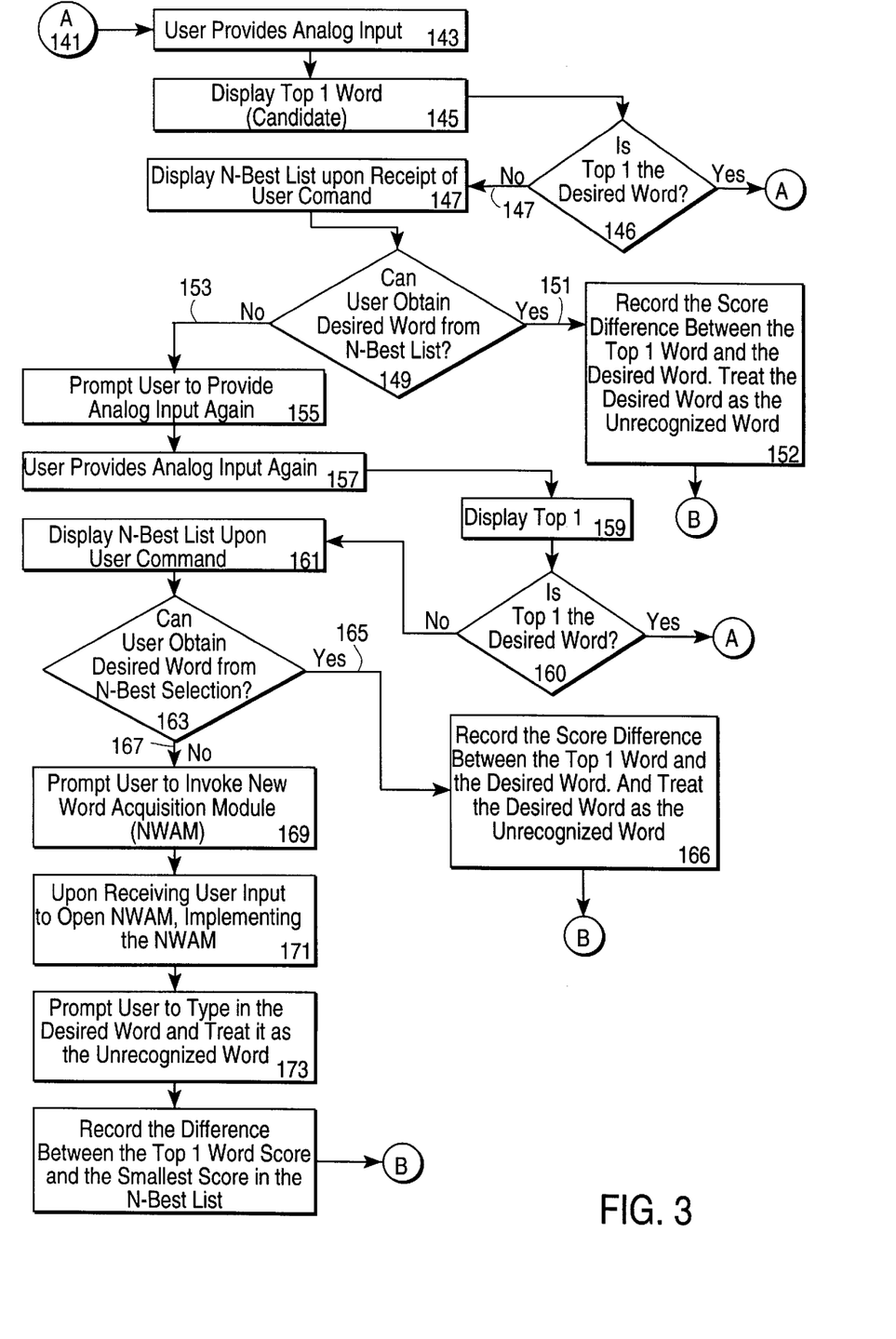
FIG. 3 is a flowchart of the user interface method of the present invention.

FIG. 3 illustrates a flow chart of a user interface method of the present invention. The User Interface Module 80 of the present invention 80 is called by another procedure in the software program 75. Processing begins at node A 141.

A user provides an analog input (e.g., speech) 143. The present invention then displays a top one word (i.e., the word having the highest probability, assigned by the program, of being the desired word) in response to the user input (step 145). A determination is made whether or not the top one word is the desired word (decision block 146). If the top one word is the desired word, the program flow returns to node A 141. If the top one word is not the desired word, the present invention displays the N-best list (i.e., an alternative word list ranked by score of each word in the list) in response to a user-initiated command (step 47).

Next, a determination is made whether the user can obtain the desired word from the N-best list (decision block 149). If the desired word can be obtained by selecting from among the N-best list, the present invention treats the desired word as an unrecognized word, and the process flow goes to node B 174. Before the process flow goes to node B, the lexical information of the desired word, and the difference between the top word score (i.e., score of the top one candidate), and the desired word score are passed to node B 174. If the user cannot obtain the desired word from the N-best list 153, then the present invention prompts the user to provide the analog input again (step 55). The user provides the analog input again (e.g., repeats the word or phrase) (step 157). The present invention then automatically displays a top one word in response to the user input (step 59). A determination is then made of whether the top one word is the desired word (decision block 160). If the top one word is the desired word, then the process flow returns to node A 141. If the top one word is not the desired word, then the present invention displays the N-best list upon a user-initiated command (step 161).

A further determination is then made of whether the user can obtain the desired word from the N-best list (decision block 63). If the desired word can be obtained by selecting from the N-best list. The present invention treats the desired word as an unrecognized word, and the process flow goes to node B 174. Before the process flow goes to node B, the lexical information of the desired word, and the difference between the top word score (i.e., score of the top one candidate), and the desired word score are passed to node B 174. If the user cannot obtain the desired word from the N-best list 167, the present invention prompts the user to type in the desired word, treats it as an unrecognized word and invokes the New Word Acquisition Module 100 (step 169). Upon receiving user input to invoke the New Word Acquisition Module 100, the present invention passes the typed word, and the difference between the top one word score and the smallest score in the N-best list to the New Word Acquisition Module 100 (step 171). Processing then proceeds to node B. The specific process steps are illustrated further in FIG. 4.

As illustrated above, the present invention provides, in addition to general rules about which words may be new words to the dictation program, a simply yet powerful user interface for advising a user to enter selected words into the lexicon. The user interface of the present invention advises the user to enter an unrecognized word into the lexicon if that word fails to present itself in an alternative word list for two consecutive tries. In general, speech dictation programs report a less than 3% error rate for a correct lexical word that is not in the alternative word list, which stores the top-10 words. Assuming that speaking the same word twice is an independent random process, the chance for a correct word in a diction program active lexicon not appearing in both alternative word lists for two consecutive tries is much less than 1% (e.g., 0.09%). Thus, the present user interface method would dramatically improve the hit rate for spotting new words.

Figure 4:
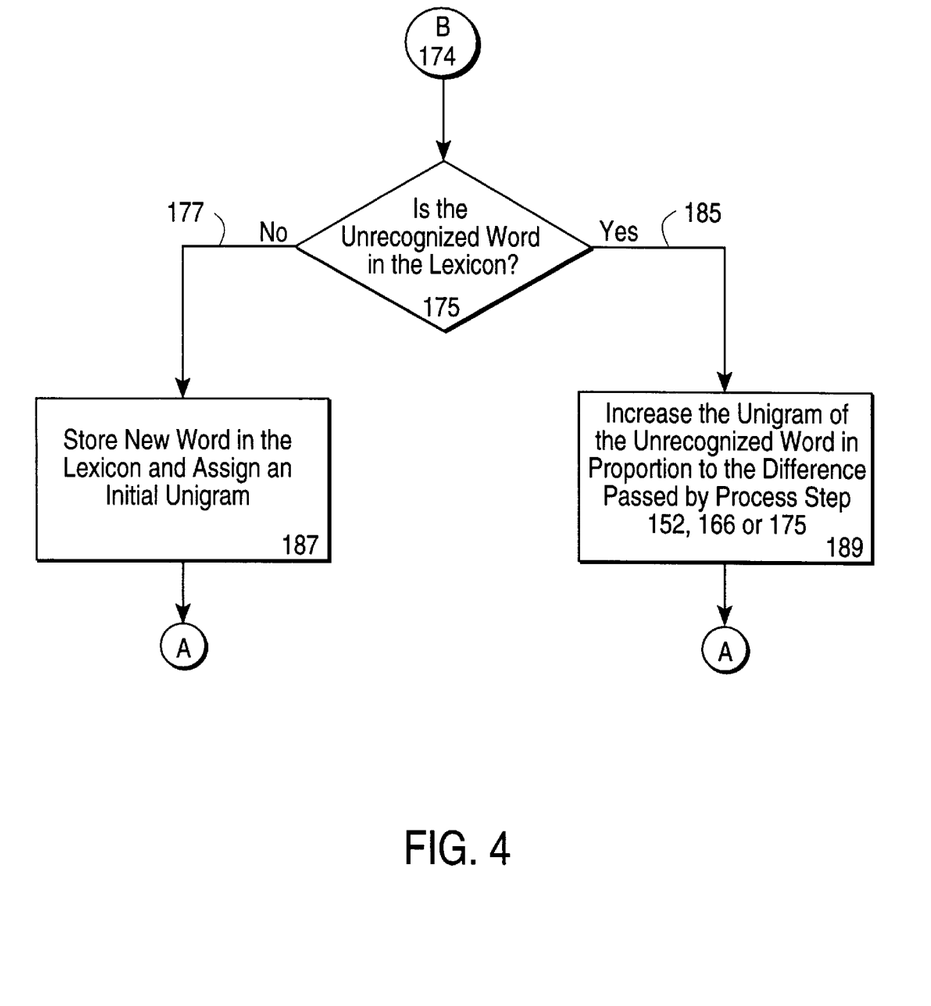
FIG. 4 is a flowchart of the general method of the present invention, as implemented in a new word module.

FIG. 4 illustrates a flow chart of the general method of the present invention, as implemented in the new word acquisition module 100. The processing continues at node B. First, a determination is made of whether the unrecognized word is in the lexicon (decision block 175). If the unrecognized word is in the lexicon (185), then the present invention increases the unigram of the unrecognized word in proportion to the difference calculated and recorded in step 152, 166, or 175. The process then returns to node A 141.

The adaptation in step 189 is usually a constant between zero and one. The present invention may also perform adaptation on acoustic Markov models. In this case, a factor, which is smaller than 1, may be used. In the event of no adaptation on the acoustic models, this constant could be assigned the value of 1 so that the unrecognized word is recognized next time with a much higher confidence (i.e., probability).

Although in this particular embodiment, the teachings of the present invention have been described with reference to improving the accuracy for unrecognized words for a speech dictation program, the present invention may be applied to any conversion program. For example, this invention may be applied directly to a handwriting recognition program or a Pin-Yin-string input conversion system to improve the accuracy for unrecognized words.

If the unrecognized word is not in the lexicon 177, then the present invention stores the new word, along with predetermined attributes that the user provides, and assigns the word an initial unigram (step 181). The processing then returns to node A 141.

Depending on the configuration of the dictation system, the program 75 may need to invoke other user interface modules to acquire parameters of the new word (e.g., pronunciation).

In the foregoing specification, the invention has been described with reference to specific exemplary embodiments thereof. It will however be evident that various modifications and changes made be made thereto without departing from the broader spirit and scope of the invention as set forth in the appended claims. The specification and drawings are accordingly to be regarded as illustrative rather than restrictive.

What is claimed is:

1. A computer implemented method for improving the accuracy of a speech recognition system, said method comprising the steps of:
   a) detecting a user speech signal;
   b) if the user speech signal is not found by the user from an alternative user input candidate list, instructing the user to input the user speech signal again;
   c) if the user speech signal is still not found by the user in the alternative user input candidate list, prompting the user to input a representation of the speech signal using a keyboard and invoking a new word module; and
   d) adapting a language model using the new word module.

2. The method of claim 1 wherein step (b) further includes the steps of:
   i) automatically displaying a top user input candidate in response to the user speech signal; and
   ii) displaying the alternative user input candidate list from which a user may select a desired user input; and
   wherein step (c) further includes the steps of:
   i) automatically displaying a top user input candidate in response to the repeated user speech signal; and
   ii) displaying in response to a user command an alternative user input candidate list corresponding to the repeated user speech signal.

3. The method of claim 1 wherein step (a) further includes the steps of:
   i) receiving an analog user speech signal;
   ii) converting the analog user speech signal into a digital input signal;
   iii) and generating a top word candidate and the alternative word list for the digital input signal through a speech recognition program.

4. The method of claim 1 wherein the user input is in the form of sound and the user input program is a speech recognition program.

5. The method of claim 4 wherein the speech recognition program is adapted to recognize a non-alphabetic language.

6. The method of claim 5 wherein the non-alphabetic language is an Asian language.

7. The method of claim 6 wherein the Asian language is Mandarin.

8. The method of claim 1, wherein the speech recognition system comprises a lexicon, said lexicon defining a plurality of words recognized by the system, each word having a score associated with the word for indicating a probability that the word will be the word spoken by a user.

9. The method of claim 8 wherein step (c) further includes the steps of:
   a) determining if the unrecognized word is in the lexicon;
   b) if the new word is not in the lexicon; adding this word to the lexicon; and
   c) if the unrecognized word is in the lexicon, increasing the score of the unrecognized word by a predetermined amount.

10. The method of claim 9 wherein a predetermined amount is proportional to one of the difference between a top word score and an unrecognized word score and the difference between a top word score and a smallest score in the N-best list.

11. The method of claim 1 wherein step c) further includes
   a) instructing the user to invoke a new word module;
   b) receiving an open new word module command; and
   c) invoking the new word module upon receipt of the command.

12. An apparatus for speech recognition comprising:
   an input for receiving speech signals into a processor;
   a processor configured to recognize the received speech signals using a language model, wherein if a speech signal is not found by the user from an alternative user input candidate list, the user is instructed to input the speech signal again, wherein if the speech signal is still not found by the user in the alternative user input candidate list, the user is prompted to input a representation of the speech signal using a keyboard and a new word module is invoked, wherein the new word module adapts the language model; and an output for providing a word sequence representative of the received speech signals.

13. The apparatus of claim 12, wherein the processor is further configured to automatically display a top user input candidate in response to the speech signal and display the alternative user input candidate list from which a user may select a desired user input.

14. The apparatus of claim 12, wherein the processor is further configured to automatically display a top user input candidate in response to the repeated speech signal and display in response to a user command an alternative user input candidate list corresponding to the repeated speech signal.

15. The apparatus of claim 12, wherein the processor is further configured to receive an analog speech signal, convert the analog speech signal into a digital input signal, and generate a top word candidate and the alternative word list for the digital input signal through a speech recognition program.

* * * * *